United States Patent [19]
Pardee

[11] Patent Number: 5,549,186
[45] Date of Patent: Aug. 27, 1996

[54] CLUTCH/BRAKE ASSEMBLY

[75] Inventor: James A. Pardee, Janesville, Wis.

[73] Assignee: Dana Corporation, Toledo, Ohio

[21] Appl. No.: 346,622

[22] Filed: Nov. 30, 1994

[51] Int. Cl.$^6$ ................................................. F16D 67/02
[52] U.S. Cl. ........................... 192/18 R; 192/89.21; 192/DIG. 1; 403/2; 403/316
[58] Field of Search ..................... 192/12 R, 14, 192/15, 16, 18 R, 89.21, 93 A, 109 R, DIG. 1; 56/11.3, 11.8; 403/2, 315, 316, 274

[56] References Cited

U.S. PATENT DOCUMENTS

| | | | |
|---|---|---|---|
| 2,985,992 | 5/1961 | Dowdle . | |
| 4,352,266 | 10/1982 | Lloyd et al. | 56/11.3 |
| 4,377,224 | 3/1983 | Takata et al. | 192/18 R |
| 4,511,023 | 4/1985 | Nagai . | |
| 4,524,853 | 6/1985 | Nagai | 192/18 R |
| 4,538,711 | 9/1985 | Takata et al. | 192/18 R |
| 4,538,712 | 9/1985 | Nagai | 192/18 R |
| 4,730,710 | 3/1988 | Granitz . | |
| 5,033,595 | 7/1991 | Pardee | 192/18 R |
| 5,285,882 | 2/1994 | Pardee | 192/84 C |

FOREIGN PATENT DOCUMENTS

| | | |
|---|---|---|
| 2013467 | 8/1979 | United Kingdom . |
| 2105429 | 3/1983 | United Kingdom . |
| 2147741 | 5/1985 | United Kingdom . |

*Primary Examiner*—Richard M. Lorence
*Attorney, Agent, or Firm*—MacMillan, Sobanski & Todd

[57] ABSTRACT

A clutch/brake assembly for selectively connecting a source of rotational power to a driven device includes an input hub and a flange secured to the input hub for rotation therewith. An output hub is journalled within the clutch/brake assembly for rotation relative to the input hub. One or more outwardly extending bosses are formed on the outer surface of the output hub. A friction plate is disposed about the input hub between the lower surface of the flange and the upper surface of the output hub. A ring of friction material is secured to the upper surface of the friction plate adjacent to the lower surface of the flange. The friction plate is connected to the output hub for rotation therewith and for axial movement relative thereto. To accomplish this, the peripheral edge of the friction plate has one or more axially extending finger portions formed integrally therewith. The finger portions have slots formed therethrough which are sized and positioned such that each of the bosses extends through one of the slots. After the output hub has been installed on the friction plate, the ends of the finger portions are bent radially inwardly to form retaining tabs which retain the output hub on the friction plate. The engagement of the bosses with the finger portions positively couples the friction plate with the output hub for rotation therewith as a unit, but permits the friction plate to move axially relative to the output hub during use. A coiled spring is disposed between the output hub and the friction plate, urging them apart from one another. The retaining tabs permit the output hub and the friction plate to be removed from the clutch/brake assembly to permit access to the interior thereof for service without requiring disassembly of the output hub from the friction plate.

15 Claims, 3 Drawing Sheets

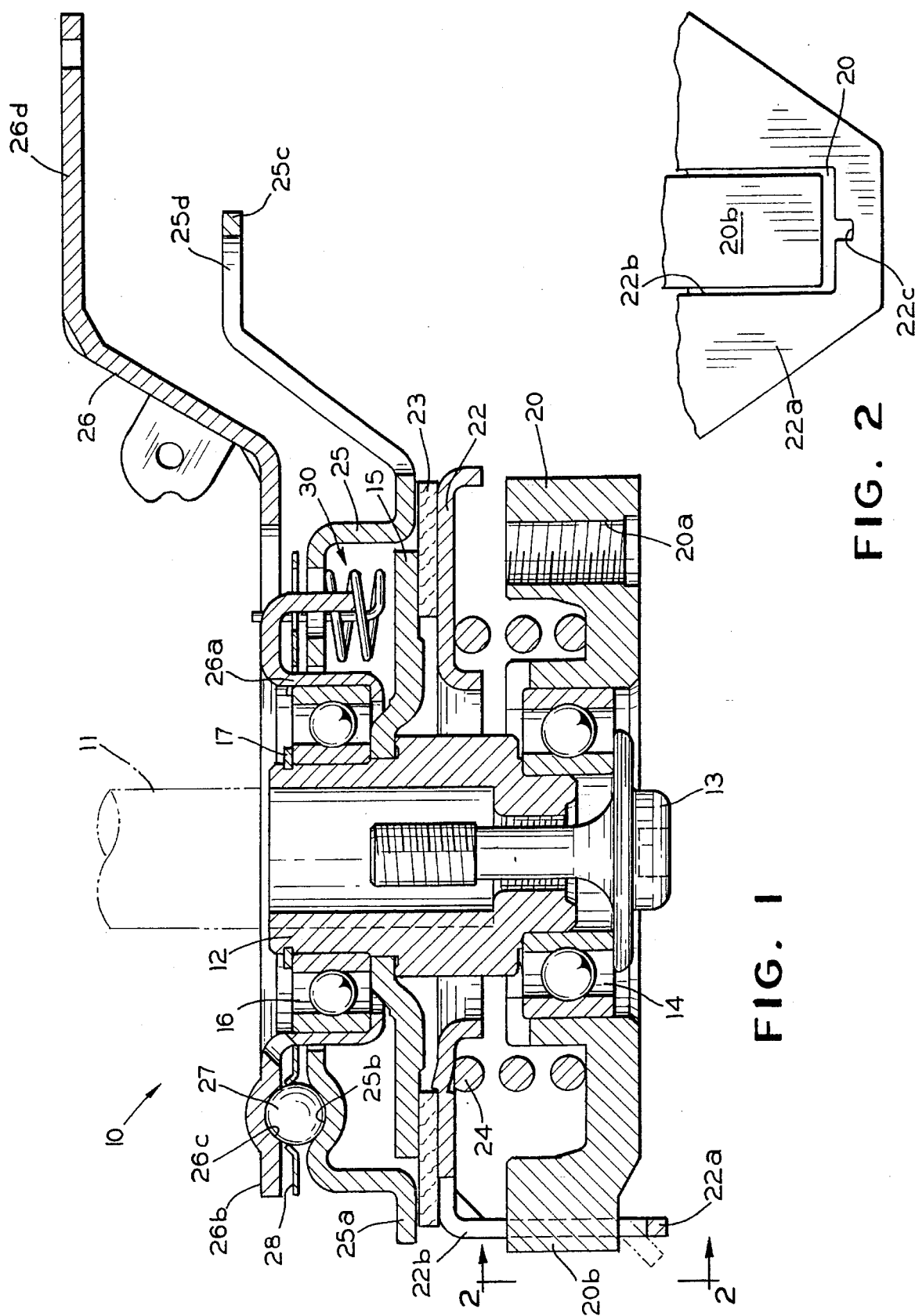

CLUTCH/BRAKE ASSEMBLY

BACKGROUND OF THE INVENTION

This invention relates in general to clutch/brake assemblies having output shafts which are selectively engaged for rotation and which are selectively braked to rapidly halt such rotation after disengagement. In particular, this invention relates to an improved structure for such a clutch/brake assembly which is relatively simple to disassemble and service.

A clutch/brake assembly is a well known device which is used in many mechanical devices to selectively connect a source of rotational power, such as an engine, to a rotatable output member. For example, a clutch/brake assembly is often provided in a walk-behind lawn mower between the engine and the rotatably driven cutting blade. When the clutch/brake assembly is engaged, the output shaft of the engine is connected to the blade so as to cause rotation thereof. When the clutch/brake assembly is disengaged, the output shaft of the engine is disconnected from the blade, and the blade is affirmatively braked to rapidly halt such rotation. Such a clutch/brake assembly typically forms part of a deadman safety assembly for the lawn mower which disconnects the blade from the engine and rapidly halts the rotation thereof when an operator removes his hand from an actuating lever or similar structure.

Known clutch/brake assemblies have been in use for many years and have functioned satisfactorily. However, as with most mechanical devices, clutch/brake assemblies require periodic servicing to maintain them in good operating condition. For example, known clutch/brake assemblies typically contain bearings and friction brake linings which must be periodically replaced. To permit this servicing to occur, the clutch/brake assembly must be disassembled, usually in the field where specialized tools are not readily available. Unfortunately, it has been found that such disassembly can be relatively difficult because the clutch/brake assembly usually contains one or more springs which function to automatically engage the brake portion of the assembly when the clutch portion of the assembly is disengaged. These springs are often loaded to a relatively large extent because of the need to rapidly halt the rotation of the output member. As a result, it is difficult to disassemble the components of the clutch/brake assembly, and even more difficult to re-assemble them after service. Thus, it would be desirable to provide an improved structure for a clutch/brake assembly which is simpler to disassemble and service than known structures.

SUMMARY OF THE INVENTION

This invention relates to an improved structure for a clutch/brake assembly for selectively connecting a source of rotational power to a driven device which is relatively simple to disassemble and service. The clutch/brake assembly includes an input hub which is keyed or otherwise secured to an output shaft of the source of rotational power for rotation therewith. A flange is secured to the input hub for rotation therewith. An output hub is journalled within the clutch/brake assembly for rotation relative to the input hub. A plurality of threaded apertures are formed in the output hub to connect a driven device thereto. One or more radially outwardly extending bosses are formed on an outer circumferential surface of the output hub. A friction plate is disposed about the input hub between the lower surface of the flange and the upper surface of the output hub. A ring of friction material is secured to the upper surface of the friction plate adjacent to the lower surface of the flange. The friction plate is connected to the output hub for rotation therewith and for axial movement relative thereto. To accomplish this, the peripheral edge of the friction plate has one or more axially extending finger portions formed integrally therewith. Each of the finger portions has an elongated axial slot formed therethrough. The finger portions extend axially over the outer surface of the output hub such that the bosses thereof are received within the slots. The engagement of the finger portions with the bosses positively couples the friction plate with the output hub for rotation therewith as a unit, but permits the friction plate to move axially relative to the output hub during use. A coiled spring is disposed between the output hub and the friction plate, urging them apart from one another. The cooperation of the bosses on the output hub with the finger portions on the friction plate permit the output hub, the spring, and the friction plate to be removed as a unit from the clutch/brake assembly for service, without requiring disassembly of the output hub from the friction plate.

Various objects and advantages of this invention will become apparent to those skilled in the art to the following detailed description of the preferred embodiment, when read in light of the accompanying drawings.

BRIEF DESCRIPTION OF THE DRAWINGS

FIG. 1 is a sectional elevational view of a clutch/brake assembly in accordance with this invention.

FIG. 2 is an enlarged side elevational view taken along line 2—2 of FIG. 1 illustrating a portion of the clutch/brake assembly.

DETAILED DESCRIPTION OF THE PREFERRED EMBODIMENT

Figure 3:
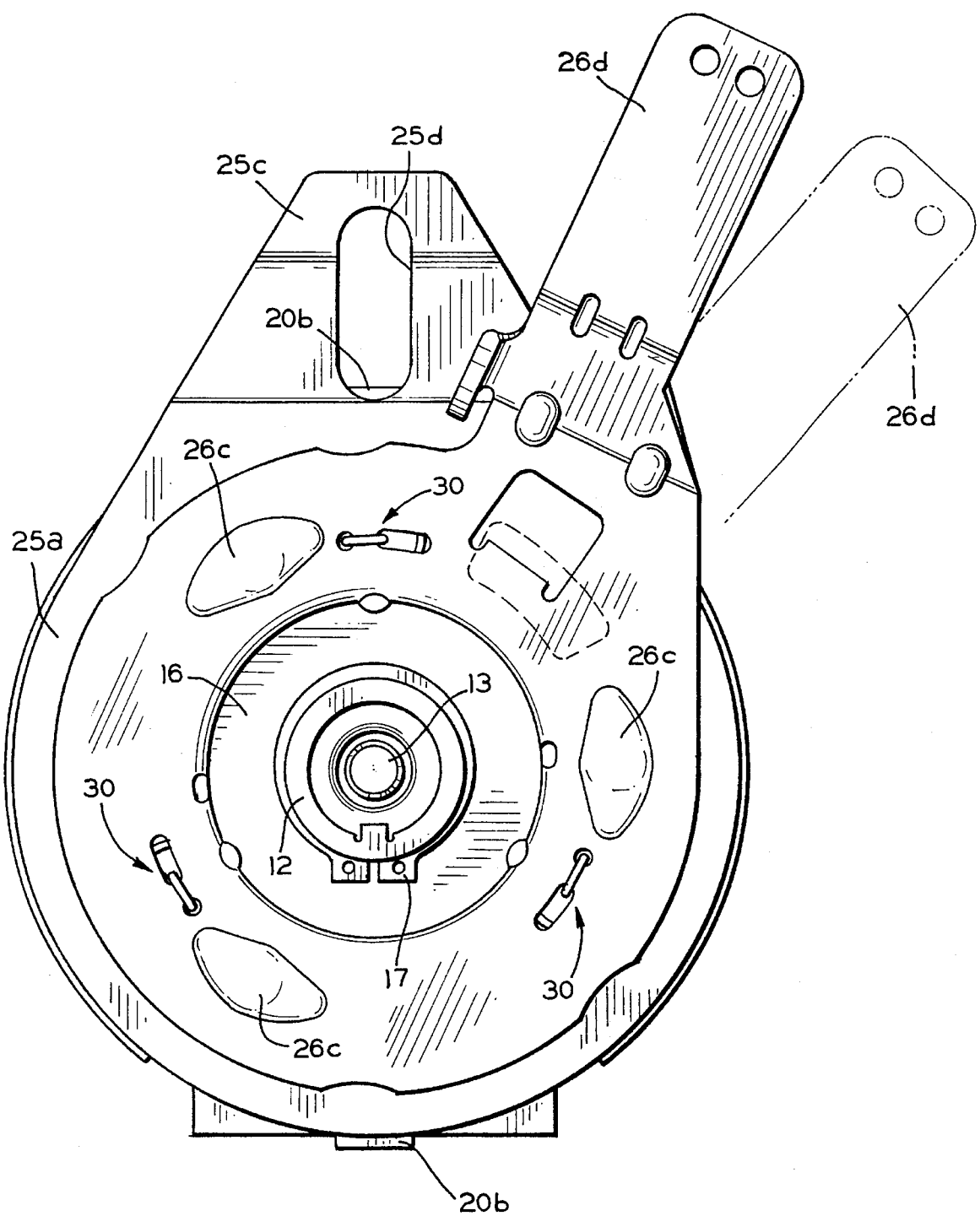
FIG. 3 is a top plan view of the clutch/brake assembly illustrated in FIG. 1.

Referring now to the drawings, there is illustrated a clutch/brake assembly, indicated generally at 10, in accordance with this invention. The clutch/brake assembly 10 is adapted for use in a mechanical device to selectively connect a source of rotational power to a rotatable output member. For example, the clutch/brake assembly 10 may be used in an otherwise conventional walk-behind lawn mower to selectively connect an output shaft (shown in dotted lines at 11) of a gasoline engine to a rotatable output member, such as a rotatably driven cutting blade. However, the clutch/brake assembly 10 may be used in conjunction with virtually any other mechanical device, as is well known in the art.

The clutch/brake assembly 10 includes an input hub 12 which is keyed or otherwise secured to the output shaft 11 of the engine for rotation therewith. A threaded fastener 13 having an enlarged head portion is threaded into the axial end of the output shaft 11 of the engine to releasably retain the clutch/brake assembly 10 thereon. An inner race of a first bearing 14 is trapped between the enlarged head of the threaded fastener 13 and a shoulder formed on the lower axial end of the input hub 12. A radially outwardly extending annular flange 15 is splined or otherwise secured to the input hub 12 for rotation therewith. Alternatively, the flange 15 may be formed integrally with the input hub 12. An inner race of a second bearing 16 is trapped between the flange 15 and a snap ring 17 disposed in a circumferential groove formed on the outer surface of the input hub 12.

Figure 4:
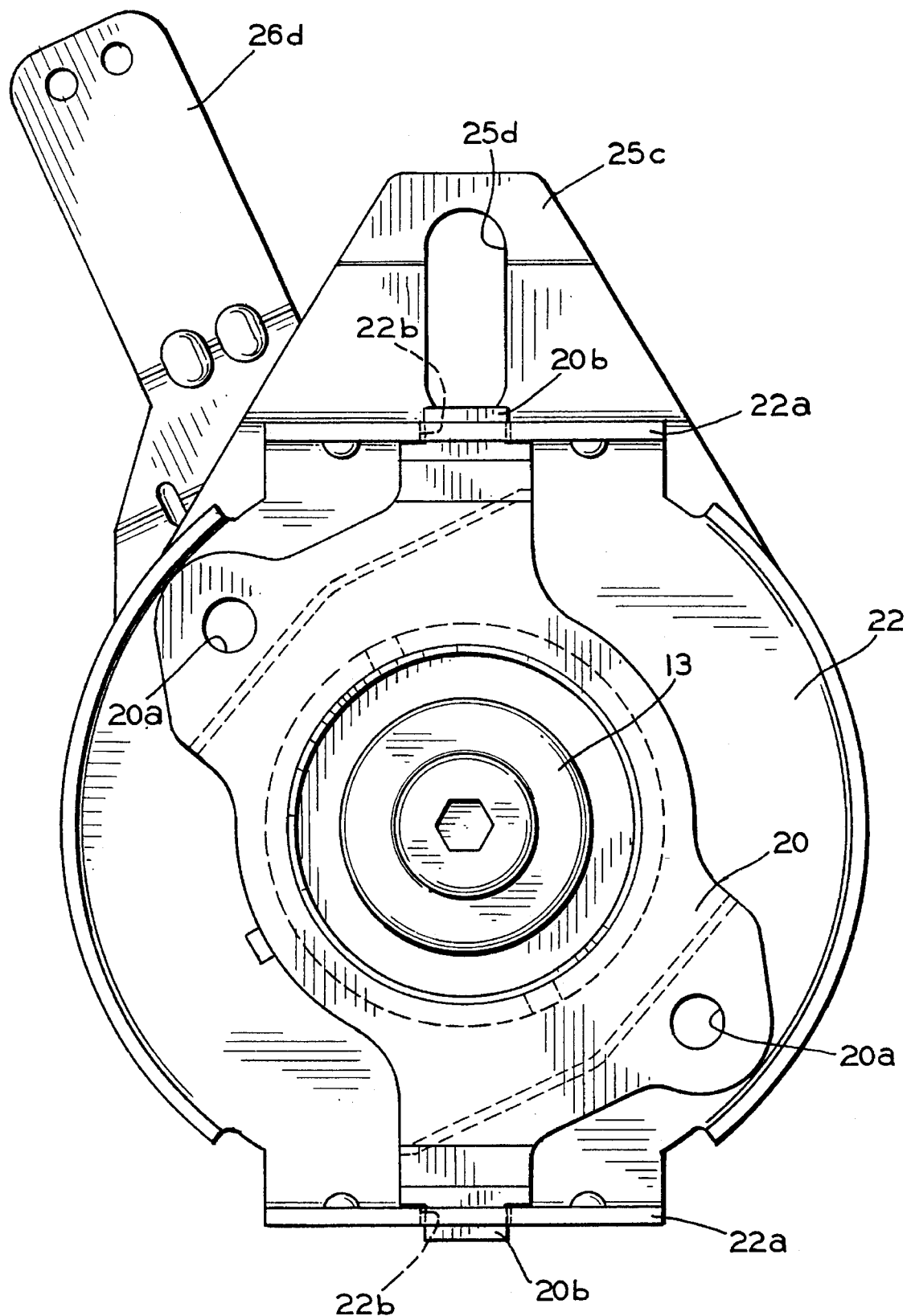
FIG. 4 is a bottom plan view of the clutch/brake assembly illustrated in FIG. 1.

An output hub 20 is journalled on an outer race of the first bearing 14 for rotation relative to the input hub 12. As best shown in FIG. 4, a plurality of threaded apertures 20a are formed in opposite sides of the lower surface of the output hub 20. In the illustrated embodiment, two of such threaded apertures 20a are formed in the lower surface of the output hub 20. A corresponding pair of threaded fasteners (not shown) can be provided to cooperate with the threaded apertures 20a to connect a driven device (not shown), such as a cutting blade of the lawn mower, to the output hub 20 for rotation therewith. One or more radially outwardly extending bosses 20b are formed in the outer circumferential surface of the output hub 20. In the illustrated embodiment, two of such bosses 20b are formed on opposite sides of the output hub 20. The purpose of these bosses 20b will be explained below.

A friction plate 22 is disposed about the input hub 12 between the lower surface of the flange 15 and the upper surface of the output hub 20. A ring of friction material 23 is secured to the upper surface of the friction plate 22 adjacent to the lower surface of the flange 15. The friction plate 22 is connected to the output hub 20 for rotation therewith, but also for axial movement relative thereto. To accomplish this, the peripheral edge of the friction plate 22 has one or more axially extending finger portions 22a formed integrally therewith. In the illustrated embodiment, two of such finger portions 22a are formed on opposite sides of the friction plate 22. As best shown in FIGS. 1 and 2, each of the finger portions 22a has an elongated axial slot 22b formed therethrough. The finger portions 22a are sized and positioned such that each extends over the outer circumferential surface of the output hub 20. When so oriented, the bosses 20b formed on the output hub 20 are respectively received within the slots 22b formed through the finger portions 22a of the friction plate 22. The engagement of the finger portions 22a with the bosses 20b positively couples the friction plate 22 with the output hub 20 for rotation therewith as a unit. However, as will be explained in further detail below, the friction plate 22 can move axially relative to the output hub 20 during use. Referring specifically to FIG. 2, it can be seen that the end of the finger portion 22a of the friction plate 22 is formed having a small axially extending notch 22c at the center of the axial end of the slot 22b. The purposes of the friction plate 22, the ring of friction material 23, and the notch 22c will be explained in further detail below.

The ends of the finger portions 22a of the friction plate 22 are initially formed having an angled configuration, as shown by the dotted lines in FIG. 1. Such angular configuration facilitates the assembly of the output hub 20 within the finger portion 22a of the friction plate 22. After the output hub 20 has been installed on the friction plate 22, the angled ends of the finger portions 22a are bent to extend axially straight, as shown by the solid lines in FIG. 1. Thus, the ends of the finger portions 22a extend over the axial ends of the bosses 20b. In this manner, the output hub 20 is retained on the friction plate 22.

This retaining structure is necessary because a coiled spring 24 or similar resilient means is disposed between the output hub 20 and the friction plate 22. Inasmuch as the output hub 20 is journalled on the first bearing 14, the spring 24 ages the friction plate 22 upwardly toward the flange 15. Consequently, the ring of friction material 23 provided on the friction plate 22 frictionally engages the lower surface of the flange 15 under the urging of the spring 24. As discussed above, the output hub 20 is connected to the friction plate 22 for rotation therewith, while the input hub 12 is connected to the flange 15 for rotation therewith. Thus, this frictional engagement of the friction plate 22 with the flange 15 causes the output hub 20 to rotate with the input hub 12.

An annular braking element 25 is disposed about the input hub 12 above the flange 15. The braking element 25 is formed having a peripheral flange portion 25a which is located above the peripheral edge of the ring of friction material 23. A plurality of circumferentially spaced grooves 25b are formed in the upper surface of the peripheral flange portion 25a of the braking element 25 for a purpose which will be explained below. The braking element 25 is further formed having an outwardly extending arm portion 25c. The outwardly extending arm portion 25c is adapted to be connected in a conventional manner to a non-rotatable component of the mechanical device, such as the engine mentioned above. Thus, rotational movement of the braking element 25 is prevented. However, as will be explained further below, the braking element 25 is supported for selective axial movement relative to the input hub 12. Thus, the connection between the outwardly extending arm portion 25c of the braking element 25 and the non-rotatable component of the mechanical device must accommodate such relative axial movement. Typically, this connection is accomplished by a pin (not shown) which extends axially through a slot 25d formed through the outwardly extending arm portion 25c of the braking member 25 to prevent relative rotational movement, but permit relative axial movement.

In FIG. 1, the braking element 25 is illustrated in a first position, wherein the peripheral flange portion 25a thereof is axially spaced apart from the peripheral edge of the friction material 23. Thus, there is no frictional engagement between the braking element 25 and the friction plate 22. However, in a manner which is described below, the braking element 25 can be moved axially downwardly to a second position, wherein the peripheral flange portion 25a thereof engages the peripheral edge of the friction material 23. When this occurs, the braking element 25 pushes the friction plate 22 downwardly against the urging of the spring 24, and the ring of friction material 23 is moved out of frictional engagement with the flange 15. Thus, it can be seen that such downward movement of the braking element 25 disengages the friction plate 22 from the flange 15 to prevent the input hub 12 from rotatably driving the output hub 20. Simultaneously, such downward movement of the braking element 25 frictionally engages the braking element 25 with the friction plate 22 to rapidly halt further rotation of the output hub 20 which would otherwise occur as a result of inertia.

Similarly, the braking element 25 can be moved axially upwardly back to the first position shown in FIG. 1, wherein the peripheral flange portion 25a thereof is disengaged frown the peripheral edge of the friction material 23. When this occurs, the friction plate 22 is moved upwardly under the urging of the spring 24, and the ring of friction material 23 is moved back into frictional engagement with the flange 15. Thus, it can be seen that such upward movement of the braking element 25 re-establishes the frictional engagement of the friction plate 22 with the flange 15 to cause the input hub 12 to rotatably drive the output hub 20. Simultaneously, such upward movement of the braking element 25 frictionally disengages the braking element 25 from the friction plate 22 to prevent any braking action from occurring, as described above.

Upward and downward movement of the braking element 25 is effected in response to turning of a rotary actuator 26.

The rotary actuator 26 is conventional in the art and includes a cup-shaped central portion 26a which is journalled on an outer race of the second bearing 16 for rotation relative to the input hub 12. The rotary actuator 26 further includes an outer peripheral edge 26b having a plurality of circumferentially spaced grooves 26c formed in the lower surface thereof. The lower grooves 26c formed in the rotary actuator 26 are located adjacent to the upper grooves 25b formed in the braking element 25. A spherical ball 27 is located in each of the aligned pairs of the grooves 25b and 26c between the braking element 25 and the rotary actuator 26. A thin cage 28 is disposed also between the braking element 25 and the rotary actuator 26 to retain the balls 27 in the aligned pairs of the grooves 25b and 26c and to maintain a fixed spacing therebetween.

The co-acting grooves 25b and 26c are ramped in such a manner that when the rotary actuator is rotated in a first direction (to the position illustrated in dotted lines in FIG. 3), the balls 27 cam against the braking element 25, urging it downwardly to disengage the friction plate 22 from the flange 15 and simultaneously engage the friction plate 22 to rapidly halt rotation of the output hub 20. Similarly, when the rotary actuator is rotated in a second direction (to the position illustrated in solid lines in FIG. 3 ), the cam action permits the braking element 25 to move upwardly to re-engage the friction plate 22 with the flange 15 and simultaneously disengage the friction plate 22 to cause rotation of the output hub 20 with the input hub 12. A plurality of conventional spring assemblies, each indicated generally at 30, is provided to urge the braking element 25 upwardly away from the friction plate 22. Thus, unless the braking element 25 is positively urged downwardly by rotational movement of the rotary actuator 26, the braking element 25 will be maintained in the position illustrated in FIG. 1

In a typical walk-behind lawn mower, rotational movement of the rotary actuator from the first position (illustrated in solid lines in FIG. 3) to the second position (illustrated in dotted lines in FIG. 3) is effected in response to movement of a movable lever of a deadman safety assembly (not shown), which is typically located adjacent to the handle of the lawn mower. The rotary actuator 26 is formed having an outwardly extending arm portion 26d which is operably connected to the lever of the deadman safety assembly. If the lever of the deadman safety assembly is released, a spring mechanism causes the rotary actuator 26 to rotated in the first direction, causing disengagement of the friction plate 22 from the flange 15 and simultaneous frictional engagement of the braking element 25 with the friction plate 22 to rapidly halt rotation of the output hub 20.

The advantage of this invention resides in the fact that the output hub 20 and the friction plate 22 are retained together as a unit by the cooperation of the bosses 20b with the slots 22b formed through the finger portions 22a. As mentioned above, the coiled spring 24 is disposed between the output hub 20 and the friction plate 22, urging them apart from one another. The cooperation of the bosses 20b with the slots 22b permits the output hub 20 and the friction plate 22 to be removed from the clutch/brake assembly 10 as a unit for servicing or replacement, and further to permit access to the interior thereof, without requiring disassembly of the output hub 20 from the friction plate 22. Such disassembly would not only be difficult because of the presence of the spring 24, but would also require the use of specialized tools to compress for re-assembly. The provision of the cooperating bosses 20b and slots 22b eliminate this need because they retain the output hub 20 and the friction plate 22 together against the urging of the coiled spring 24.

Although the clutch/brake assembly 10 of this invention has been disclosed as having two finger portions 22a on the friction plate 22 which extend over respective bosses 20b formed on the output hub 20, it will be appreciated that fewer or more of such cooperating finger portions 22a and bosses 20b may be provided. Similarly, it will be appreciated that structures other than the specifically disclosed cooperating finger portions 22a and bosses 20b may be to provided for retaining the friction plate 22 and the output hub 20 together as a unit when removed from the clutch/brake assembly 10.

As mentioned above, the end of the finger portion 22a of the friction plate 22 is formed having a small axially extending notch 22c at the center of the axial end of the slot 22b. It has been found that after a period of use, the end of the finger portion 22a may fracture at one of the corners of the slot 22b. The notch 22c provides a fail safe fracture point for the end of the finger portion 22a. If a fracture does occur, it will occur at or near the notch 22c, which is located next the center of the slot 22b. Thus, a sufficient amount of material will remain at the sides of the end of the finger portion 22a to retain the boss 20b therein. Consequently, the output hub 20 and the friction plate 22 will be retained together as a unit under the urging of the spring 24, even if a fracture occurs.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A clutch/brake assembly comprising:

an input hub adapted to be connected to a source of rotational power;

an output hub adapted to be connected to a driven device, said output hub having a boss formed thereon;

a friction plate including a finger portion having a slot formed therethrough, said boss extending through said slot such that said friction plate is connected to said output hub for rotational movement therewith and for axial movement relative thereto;

means for retaining said friction plate and said output hub together so that said friction plate anal said output hub can be removed from said clutch/brake assembly as a unit; and means for selectively connecting said friction plate to said input hub such that said output hub is driven to rotate with said input hub.

2. The clutch/brake assembly defined in claim 1 wherein means for retaining said friction plate and said output hub together includes a boss formed on said output hub and a finger portion formed on said friction plate, said finger portion having a slot through which said boss extends such that said friction plate and said output hub are retained together.

3. The clutch/brake assembly defined in claim 2 wherein said finger portion further includes a notch formed at an end of said slot.

4. The clutch/brake assembly defined in claim 1 wherein said means for retaining said friction plate and said output hub together includes a plurality of bosses formed on said output hub and a plurality of finger portions formed on said friction plate, each of said finger portions having a slot through which said bosses respectively extend such that said friction plate and said output hub are retained together as a unit.

5. The clutch/brake assembly defined in claim 4 wherein each of said finger portions further includes a notch formed at an end of said slot.

6. A clutch/brake assembly comprising:

an input hub adapted to be connected to a source of rotational power;

an output hub adapted to be connected to a driven device, said output hub having a boss formed thereon;

a friction plate including a finger portion extending over said output hub, said finger portion having a slot through which said boss extends to connect friction plate to said output hub for rotational movement therewith and for axial movement relative thereto, said boss cooperating with said slot so that said friction plate and said output hub can be removed from said clutch/brake assembly as a unit;

a spring for urging said friction plate and said output hub apart from one another; and means for selectively connecting said friction plate to said input hub such that said output hub is driven to rotate with input hub.

7. The clutch/brake assembly defined in claim 6 wherein said finger portion further includes a notch formed at an end of said slot.

8. The clutch/brake assembly defined in claim 6 wherein a plurality of bosses are formed on said output hub and a plurality of finger portions are formed on said friction plate, each of said finger portions having a slot through which said bosses respectively extend such that said friction plate and said output hub are retained together as a unit.

9. The clutch/brake assembly defined in claim 8 wherein each of said finger portions further includes a notch formed at an end of said slot.

10. A clutch/brake assembly comprising:

an input hub adapted to be connected to a source of rotational power, said input hub including a flange supported for rotation therewith;

an output hub adapted to be connected to a driven device, said output hub being journalled on said input hub for rotation relative thereto, said output hub having a boss formed thereon;

a friction plate including a finger portion extending over said output hub, said finger portion having a slot through which said boss extends to connect friction plate to said output hub for rotational movement therewith and for axial movement relative thereto and to retain said friction plate and said output hub together, said boss cooperating with said slot so that said friction plate and said output hub can be removed from said clutch/brake assembly as a unit;

a spring for urging said friction plate and said output hub apart from one another toward a first position, wherein said friction plate engages said flange and said output hub is driven to rotate with said input hub; and means for selectively moving said friction plate toward a second position against the urging of said spring, wherein said friction plate does not frictionally engage said flange and said output hub is not driven to rotate with said input hub.

11. The clutch/brake assembly defined in claim 10 wherein said finger portion further includes a notch formed at an end of said slot.

12. The clutch/brake assembly defined in claim 10 wherein a plurality of bosses are formed on said output hub and a plurality of finger portions are formed on said friction plate, each of said finger portions having a slot through which said bosses respectively extend such that said friction plate and said output hub are retained together as a unit.

13. The clutch/brake assembly defined in claim 12 wherein each of said finger portions further includes a notch formed at an end of said slot.

14. The clutch/brake assembly defined in claim 10 wherein said means for selectively moving said friction plate toward a second position includes a brake plate which is movable between a first position, wherein said brake plate engages said friction plate and moves said friction plate to said second position against the urging of the spring, and a second position, wherein said brake plate does not engage said friction plate.

15. The clutch/brake assembly defined in claim 14 further including an actuator for selectively moving said brake plate between said first and second positions.

* * * * *

UNITED STATES PATENT AND TRADEMARK OFFICE
CERTIFICATE OF CORRECTION

PATENT NO. : 5,549,186
DATED : August 27, 1996
INVENTOR(S) : James A. Pardee

It is certified that error appears in the above-indentified patent and that said Letters Patent is hereby corrected as shown below:

Column 6, Claim 1, Line 44, after "plate", change "anal" to -- and --.

Signed and Sealed this

Fifth Day of November, 1996

Attest:

BRUCE LEHMAN

*Attesting Officer*     *Commissioner of Patents and Trademarks*